Dec. 9, 1952     T. R. SMITH     2,621,011
HIGH-PRESSURE VALVE SEAL
Filed Nov. 20, 1946
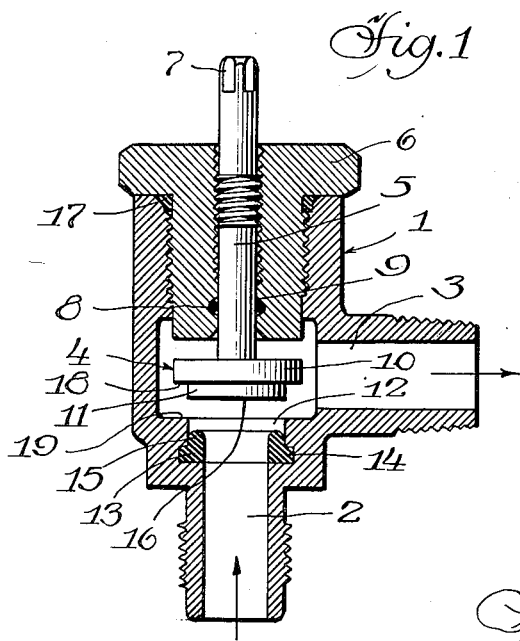
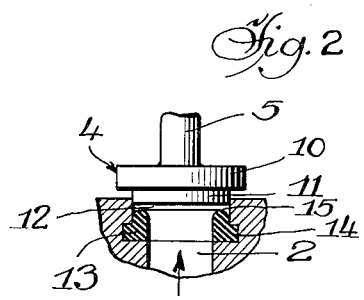
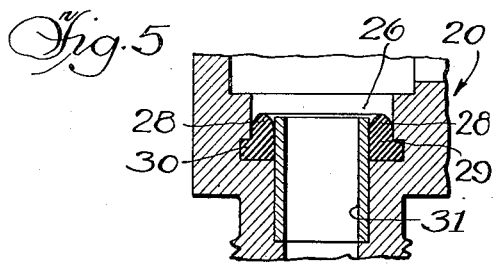
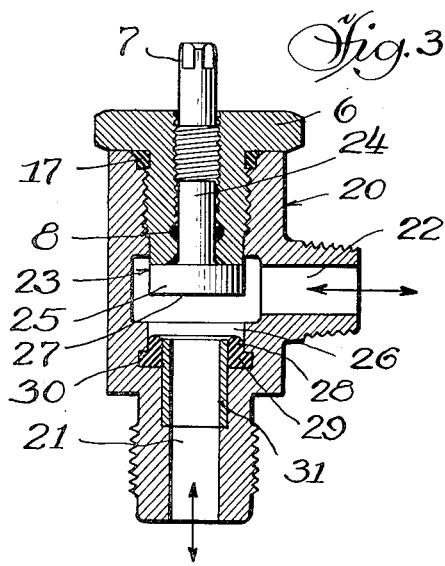
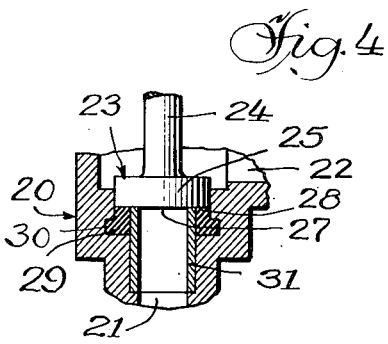
INVENTOR.
Thomas R. Smith
BY
Carl F. Geppert
Atty.

Patented Dec. 9, 1952

2,621,011

UNITED STATES PATENT OFFICE 2,621,011

HIGH-PRESSURE VALVE SEAL

Thomas R. Smith, Newton, Iowa, assignor to The Maytag Company, Newton, Iowa, a corporation of Delaware Application November 20, 1946, Serial No. 711,004

5 Claims. (Cl. 251—27)

The present invention relates to a valve and especially to a novel valve seal assembly.

Among the objects of the present invention is the provision of a novel valve seal particularly adapted for sealing fluid under high pressure and in which the sealing element is mounted or anchored in the valve body.

Another important feature of the present novel invention is the provision of a valve assembly, in which the valve plunger and sealing element are so designed and constructed that the lower end of the valve plunger enters the opening to be sealed prior to engaging the sealing element, whereby the flow of fluid is substantially restricted or stopped before complete sealing is effected. This prevents damage to or extrusion of the sealing element regardless of the pressure of the fluid in the line.

A further object of the present invention is the provision of a novel seal assembly and in the novel manner of mounting and arranging the seal whereby the sealing element is placed under limited squeeze or compression when the valve is closed, thereby positively sealing the fluid passage and preventing extrusion of the resilient sealing element.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in vertical cross-section through a novel seal assembly embodying the novel invention and with the valve in open position.

Fig. 2 is a fragmentary view in vertical cross-section showing the valve in partially closed position.

Fig. 3 is a view similar to Fig. 1 but of a modified construction.

Fig. 4 is a fragmentary view in vertical cross-section of the valve assembly of Fig. 3 in closed position.

Fig. 5 is a fragmentary enlarged view of Fig. 3 to more clearly show the assembly and arrangement of the sealing member and associated parts, and the space provided around the sealing lip to prevent extrusion thereof when the valve is closed.

Referring more particularly to the novel embodiments selected to illustrate the present invention, that shown in Figs. 1 and 2 comprises a valve assembly including a valve body 1 having an inlet 2 provided with an inwardly extending end portion and an outlet 3 for passage of liquid or other fluid under pressure. A valve plunger or shut-off member 4 is provided with a shaft or stem 5 extending through and threaded into a cap 6 for longitudinal movement. This stem is adapted to be rotated by a handle or other suitable means (not shown) mounted on its outer end 7. The cap 6 is threaded into the upper open end of the valve body and a suitable packing 17 is provided for sealing against leakage therebetween, and leakage along the stem is prevented by providing a resilient sealing ring 8 adapted to encompass the valve stem 5 and seat within an inwardly opening recess or groove 9 provided in the internal diameter of the cap. The valve plunger 4 comprises a head 10 having a reduced lower end portion 11 to provide a radially extending shoulder 18 and a lower sealing face or seating surface 16. This reduced portion 11 is adapted to enter and closely fit an enlarged opening 12 in the upper inlet end 2 in the valve body when the stem 5 is rotated in a closing direction.

Disposed in the opening 12 and slightly below an upper abutment or face 19 is an annular self-sealing resilient sealing element or sealing ring 13 provided with an external flange 14 anchored in an annular recess formed or provided in the valve body. The sealing ring 13 is provided with an upstanding part or resilient sealing lip 15, having its upper end preferably rounded, for sealing contact with the lower seating surface 16 of the reduced lower end 11 on the valve plunger.

To shut off the flow through the inlet, passage or orifice 2 the shaft or stem 5 is turned or moved in a closing direction and due to its threaded connection it lowers the plunger until the lower reduced end 11 thereof enters the opening 12 of the inlet whereby to substantially cut off or restrict the flow of the incoming fluid as shown in Fig. 2. Further closing movement of the plunger causes the lower seating surface 16 thereon to engage the sealing lip 15 on the upstanding part of the sealing member which completely seals off the valve. The amount of compression that can be applied to the sealing lip or face is predetermined and is limited by the distance the plunger can travel, after the lower seating surface 16 contacts the sealing lip 15, before the shoulder 18 on the plunger contacts the adjacent face 19 in the valve body.

In Figs. 3, 4 and 5, is shown an alternate construction in which the valve body 20 is provided with an inlet 21 and an outlet 22, although due to the novel assembly and construction these ports may be reversed so that the fluid under pressure may flow in either direction. A plunger or shut-off member 23 is provided with a shaft or stem 24 and a portion or head 25 of such cross-section that it may when moved in a closing direction enter and substantially close an opening 26 at the upper end of the passage 21, whereupon its lower seating surface 27 seats upon a sealing end or lip 28 of a resilient sealing member 29 disposed below the top surface of the opening.

As shown in Fig. 3, the sealing element 29 is anchored in position by means of an annular flange 30 seating in a recess or groove provided in the body of the valve and surrounding the lower end of the opening 26. A retainer sleeve 31 is suitably anchored in the passage 21 as by means of a press fit, or in any other manner, whereby it is maintained within this passage and against the internal diameter of the sealing element. The upper end of this sleeve is disposed a predetermined distance below the upper edge of the sealing lip 28 whereby to form a stop or shoulder to prevent the plunger from being further lowered upon contact therewith.

Fig. 4 shows the plunger 23 lowered to close the valve and in which position the sealing lip has been contacted and compressed by engagement therewith of the lower or seating surface 27 of the head 25, and this seating surface is limited against further movement by contact with the upper edge of the retainer sleeve 31.

In both forms of the invention there is provided a stop for limiting the movement of the plunger or shut-off member. In Figs. 1 and 2, the stop 19 for the plunger surrounds the sealing element, while in Figs. 3, 4 and 5 the stop is concentric with the sealing element but in the form of a sleeve 31 disposed at the inside diameter of the sealing element. In both forms, the compression of the resilient sealing lip or face is predetermined by the amount the plunger may move until it contacts the stop, and in both forms such limitation on the squeeze or compression prevents extrusion.

As will be apparent from the drawings, it is contemplated to provide sufficient space about or adjacent the upper end of the sealing member to permit the desired squeeze or compression without damage to the sealing element and without extrusion. Any resilient material such as natural or compounded synthetic rubber or rubber-like material may be employed.

Having thus described my invention, I claim:

1. A valve seal for preventing the passage of fluid, comprising a body member having a passage therein for fluid under pressure and opening into the body member, a stop surface surrounding the opening, said passage at the opening and adjacent the stop surface being enlarged to constitute a recess having an undercut portion providing an inwardly extending shoulder disposed below the stop surface and an annular portion of greater diameter than the passage extending from the shoulder to the stop surface, an annular self-sealing resilient sealing member having its outer periphery conforming to and disposed in the recess and against the shoulder and provided with a central opening conforming to and forming the outlet for the passage, said sealing member having an upwardly projecting sealing lip with its upper sealing end extending toward but terminating below the stop surface, and a shut-off member adjustably mounted in said body member and provided with a reduced central portion having a lower seating surface for sealing contact with the upper end of the sealing lip and a shoulder spaced therefrom, said reduced portion entering and closely fitting said passage when it is moved toward its closed position to restrict the flow of fluid therethrough and upon further movement the seating surface contacts the upper end of said sealing lip to seal against leakage, and thereafter said shoulder on said shut-off member contacts the stop surface on said body member to limit the axial compression on said resilient sealing member after a predetermined amount of axial compression.

2. In a valve seal for controlling the flow of fluid under pressure, comprising a valve body having a passage opening into the valve body for the transmission of fluid and an enlarged recess at the outlet end of the passage, a resilient sealing member encompassing said passage and conformably received within said recess and having an outwardly projecting flange securely anchored to said body and an upper sealing end disposed adjacent to but below the outlet end of the passage, a sleeve member rigidly secured to said body in said passage and provided with an upper shoulder disposed adjacent to but below the upper sealing end of said sealing member, a shut-off member adjustably mounted in said body and provided with a part having a lower seating surface conforming to the recess and adapted to enter and closely fit said recess when it is moved in a closing direction to restrict the flow of fluid therethrough and upon further closing movement the seating surface contacts the upper sealing end of said sealing member to seal against leakage, and a space provided between said sleeve member and said body to allow for the compression of said sealing member to permit the seating surface to contact the shoulder on said sleeve member and to prevent extrusion of said sealing member.

3. A valve seal construction comprising a valve body provided with a fluid passage therein opening into the body and thereat provided with an enlarged recess having an undercut portion, a stop surface surrounding the recess, a resilient sealing member having an anchoring flange provided at one end thereof disposed in said recess and undercut portion and an upstanding sealing portion at the other end thereof disposed inwardly of the stop surface and with its upper sealing end disposed below the same, and a shut-off member provided with a depending part having a seating surface on its lower end conforming to and adapted to enter said enlarged recess to restrict the flow therethrough, said shut-off member having a shoulder adapted to contact the stop surface to thereby limit the closing movement of said shut-off member after its seating surface enters said recess and engages and compresses the upper sealing end of the resilient sealing member a predetermined amount.

4. In a seal construction for preventing the passage of fluid under pressure, a valve body having a passage for the transmission of the fluid and an enlarged recess at the outlet end of the passage opening into the valve body, a stop provided in the valve body, a resilient sealing member encompassing the passage and conformably received within the recess and provided with an external flange and an upstanding annular self-sealing lip terminating below the outlet end of the recess, a shut-off member adjustably mounted in the valve body and provided with a part conforming to and adapted to be received within the recess to restrict the flow of fluid therethrough and having a seating surface for engaging the upper end of the sealing lip when the part is moved into the recess and a surface adjacent the seating surface for engaging the stop, whereby in closing the valve the part on the shut-off member first substantially restricts the flow through the recess and thereafter the seating surface engages the upper end of the sealing lip and axially compresses the sealing member, the amount of axial compression to which the sealing member may be subjected being limited by the engagement of the surface on the shut-off member adjacent the seating surface engaging the stop whereby to prevent extrusion of the sealing member.

5. In a seal construction for preventing the flow of fluid under pressure, a body provided with a passage therein for the transmission of the fluid and an enlarged recess at the outlet end of the passage opening into the body, a stop provided in the body, an adjustable shut-off member provided with a seating surface disposed on the lower portion thereof conforming to and adapted to enter said enlarged recess to restrict the flow of fluid therethrough, a resilient sealing member surrounding said passage and conformably received in the recess and having an annular outwardly projecting flange securely anchored to said body and an upstanding sealing lip terminating below the open end of the recess and with its upper end arranged for sealing contact with said seating surface, said resilient sealing lip coacting between said seating surface and said body so that when said shut-off member is moved in a closing direction it enters the enlarged recess to thereby restrict the flow therethrough, after which the seating surface contacts the upper end of said sealing lip to positively seal said passage and recess by means of the fluid under pressure, and a surface on the shut-off member engaging the stop in the body for limiting the compression of said resilient sealing member to prevent extrusion thereof.

THOMAS R. SMITH.

REFERENCES CITED

The following references are of record in the file of this patent:

UNITED STATES PATENTS

| Number | Name | Date |
| --- | --- | --- |
| 372,077 | Luce | Oct. 25, 1887 |
| 565,682 | Jenkins | Aug. 11, 1896 |
| 831,742 | Pownall | Sept. 25, 1906 |
| 1,394,022 | Jones | Oct. 18, 1921 |
| 1,650,077 | Lamb | Nov. 22, 1927 |
| 1,671,139 | Wilson | May 29, 1928 |
| 2,123,477 | Sheedy | July 12, 1938 |
| 2,151,442 | Roberts | Mar. 21, 1939 |
| 2,208,929 | Jaegle | July 23, 1940 |
| 2,403,023 | Smith | July 2, 1946 |
| 2,408,006 | Smith | Sept. 24, 1946 |
| 2,414,908 | Smith | Jan. 28, 1947 |
| 2,585,863 | Smith | Feb. 12, 1952 |

FOREIGN PATENTS

| Number | Country | Date |
| --- | --- | --- |
| 586,854 | France | of 1925 |